(12) United States Patent
Bruso

(10) Patent No.: US 6,805,518 B2
(45) Date of Patent: Oct. 19, 2004

(54) METHOD OF IN SITU SOIL REMEDIATION FOR VOLATILE ORGANIC CONTAMINANTS

(76) Inventor: Bruce L. Bruso, RR1, Box 211E, Park La., Hegins, PA (US) 17938

( * ) Notice: Subject to any disclaimer, the term of this patent is extended or adjusted under 35 U.S.C. 154(b) by 0 days.

(21) Appl. No.: 09/841,908

(22) Filed: Apr. 25, 2001

(65) Prior Publication Data

US 2001/0038773 A1 Nov. 8, 2001

Related U.S. Application Data

(60) Provisional application No. 60/201,520, filed on May 2, 2000.

(51) Int. Cl.[7] .................................................. B09C 1/06
(52) U.S. Cl. ............................... 405/128.8; 405/128.5; 405/128.75; 405/128.85; 405/128.55
(58) Field of Search ............................. 405/128, 128.1, 405/128.15, 128.2, 128.25, 128.3, 128.35, 128.4, 128.45, 128.5, 128.55, 128.6, 128.65, 128.7, 128.8, 128.85, 128.9

(56) References Cited

U.S. PATENT DOCUMENTS

| | | | | |
|---|---|---|---|---|
| 4,834,194 A | * | 5/1989 | Manchak, Jr. | 166/250.01 |
| 4,844,807 A | * | 7/1989 | Manchak, Jr. | 175/50 |
| 5,190,405 A | * | 3/1993 | Vinegar et al. | 210/747 |
| 5,242,246 A | | 9/1993 | Manchak, III et al. | 405/128 |
| 5,244,310 A | * | 9/1993 | Johnson | 405/128.4 |
| 5,631,160 A | | 5/1997 | Bruso | 435/262.5 |
| 5,639,182 A | | 6/1997 | Paris | 405/128 |
| 5,824,541 A | | 10/1998 | Horn et al. | 435/262.5 |
| 5,830,752 A | | 11/1998 | Bruso | 435/283.1 |
| 5,988,947 A | | 11/1999 | Bruso | 405/128 |
| 6,019,548 A | | 2/2000 | Hoag et al. | 405/128 |
| 6,102,621 A | * | 8/2000 | Siegrist et al. | 405/128.5 |
| 6,127,592 A | * | 10/2000 | Knauss et al. | 588/205 |
| 6,283,675 B1 | * | 9/2001 | Dulsey et al. | 405/128.5 |
| 6,387,278 B1 | * | 5/2002 | Leif et al. | 210/747 |
| 6,543,963 B2 | * | 4/2003 | Bruso | 405/128.15 |

OTHER PUBLICATIONS

Siegrist et al., "Principles and Practices of in Situ Chemical Oxidation using Permanganate", BattelleMemorial Insitute-Batttlelle Press, 2001, esp. pp. 277–286.*
Schwartz et al., Water Resources Research Grant Proposal "In–Situ Destruction of Solvents by Permanganate Oxidation" 3 pages, Sep. 1998 or earlier.*
Batelle Press Online Bookstore, Abstract and Table of Contents, ", Physical Chemical and Thermal Technologies: Remediaiton of Chlorinated and Recalcitrant Compounds" 7 pages, 1998.*
"The Excavator" From Trencor, vol. 1, No. 1, 1999.
"The World's Leading Manufacturer Of Track Mounted Trenching Equipment", Trencor, Inc. brochure.

* cited by examiner

Primary Examiner—Robert J. Sandy
Assistant Examiner—Katherine W Mitchell
(74) Attorney, Agent, or Firm—Drinker Biddle & Reath L.L.P.

(57) ABSTRACT

A preferred method of soil remediation in which contaminant organic compounds are removed from soil by a sequential process in which the bulk of natural and contaminant organic compounds are stripped from the soil by hot air injection, followed by applying a strong oxidizing agent, preferably a permanganate, to reduce residual organic contaminant concentration to acceptable levels. Hot air is injected into the soil as it is being churned by the soil mixing device, preferably a chain trencher, to strip off organic compounds. The vapors may be collected through a vacuum hood disposed over the soil mixing device. When the thermal stripping has reduced the bulk hydrocarbon content of the soil (and thus reduced the oxidant demand), an effective amount of permanganate or other strong oxidizing agent is mixed into the soil to reduce the residual organic contaminants. Hot air can also be injected into the soil as or after the oxidizing agent is introduced to accelerate the oxidation rate. In cold wet clay soils, the grounds may be preheated prior to the application of the oxidation agent.

13 Claims, No Drawings

US 6,805,518 B2

METHOD OF IN SITU SOIL REMEDIATION FOR VOLATILE ORGANIC CONTAMINANTS

RELATED APPLICATIONS

This application is based upon and claims priority from U.S. provisional application No. 60/201,520 filed May 2, 2000.

BACKGROUND OF THE INVENTION

1. Technical Field

This invention is related to the general field of soil remediation and to the more specific fields of soil remediation using chemical oxidizing agents.

Contaminated soil is a widespread problem resulting from years of unregulated industrialization. Because contaminated soil poses substantial health hazards, various remediation technologies have been developed to clean-up contaminated sites. Removal of the contaminated soil for disposal or treatment off-site is a generally costly procedure, particularly where the contaminated site must then be restored with clean fill. In-situ treatment is generally preferred where the conditions permit its use.

2. Related Prior Art

Chemical oxidation is known to be an effective means to treat a wide range of organic contaminants. Strong oxidants, such as ozone, hydrogen peroxide and permanganate have been suggested to treat soil and ground water contaminants via several delivery methods, including surface application, seepage, percolation, wells and push tools. Permanganate in particular is a very effective oxidizing agent for organic contaminants such as, but not limited to: benzene, ethyl benzene, toluene, xylene, methylene chloride, 1,2-dichloroethane, 1,1,1-trichloroethane (TCA), carbon tetrachloride, chloroform, chlorobenzenes, ethylene dibromide, tertiary butyl ether, tetrachloroethylene (PCE), trichloroethene (TCE), dichloroethene (DCE) and vinyl chloride.

As shown in U.S. Pat. No. 6,019,548, however, there is a presumption against using large quantities of permanganate, particularly for in-situ soil remediation, because the permanganate oxidation reaction precipitates manganese dioxide, which is a solid compound at ambient temperature. Although manganese dioxide is a generally harmless and naturally-occurring mineral, the common supposition is that the total oxidant demand of the natural organic material in most contaminated soil would require the application of such a large volume of permanganate in order to oxidize the organic contaminants to an acceptably safe concentration that the resulting concentration of manganese dioxide in the soil would be unacceptable. Thus, U.S. Pat. No. 6,019,548 teaches the use of another water-soluble oxidizing agent before or with the permanganate agent to satisfy the soil's natural oxidant demand, leaving the organic contaminants to be preferentially oxidized by the permanganate.

When using injection methods that require a permanganate oxidizing agent to migrate or percolate though the soil, such as pressure injection through wells or pipes, or attempting to seep permanganate into the soil by spreading it on the surface, the production of excess manganese dioxide may also inhibit the process. The formation of manganese dioxide by oxidation of the soil's natural organic materials may, as U.S. Pat. No. 6,019,548 describes, form its own migration barrier by progressively reducing the soil permeability as it advances.

This migration barrier problem can be overcome if the permanganate is applied to the soil using a soil mixing device, preferably a chain trenching tool, as described in the applicant's prior U.S. Pat. No. 5,631,160, entitled "Method for In-Situ Soil Remediation". The trenching tool churns and lifts soil to the surface and drops it back into the trench. This mechanical agitation very efficiently comminutes and aerates the soil, while injection nozzles near the chain can be used to introduce and mix the permanganate into the soil. The uniform distribution of the permanganate caused by this repeated churning of the soil brings the permanganate into close proximity to disbursed organic contaminants without having to depend upon migration through the soil.

Even with mechanical soil mixing, however, the amount of permanganate needed to treat heavily contaminated soil to attain the very low concentrations of organic contaminant that are acceptable safe target levels would still be great. Many of the highly contaminated sites have both a high concentration of organic contaminant and a high natural hydrocarbon composition. The amount of permanganate needed to oxidize to an acceptable safe level of contaminant would make the process very costly and would result in soil with an undesirable level of manganese dioxide.

BRIEF SUMMARY OF THE INVENTION

These problems can be alleviated by a sequential remediation process in which hot air injection is used for thermal stripping of bulk hydrocarbon from the soil before the permanganate or other strong chemical oxidizing agent is introduced. Thermal stripping with hot air is an effective remediation technique for high concentrations of many volatile contaminants and will simultaneously strip volatile natural hydrocarbons from the soil. Thermal stripping yields diminishing returns, however, as the contaminant concentration is reduced to trace levels that are normally considered acceptable levels. The sequential process uses hot air thermal stripping until a remediation effectiveness plateau is reached, then an effective amount of permanganate or other chemical oxidizing agent is introduced and mixed into the soil. Since the bulk of both natural organics and organic contaminant have been stripped off by the hot air treatment, the amount of oxidizing agent needed to further reduce the contaminant concentration to below the target level is reasonably low.

The preferred method of injecting hot air into the soil for the initial thermal stripping is through injection nozzles adjacent a trenching tool as described in U.S. Pat. No. 5,631,160. This method and apparatus can be used for the initial thermal stripping, and for the follow-up treatment with a chemical oxidizer such as permanganate. When used in conjunction with an oxidizing agent such as permanganate, the permanganate can be injected through the nozzles, and/or hot air can be injected after the permanganate introduction to raise the temperature of the soil and accelerate the oxidation rate. In both stages, vapors from the soil can be collected through a vacuum hood disposed over the soil-mixing device as described in the above patent to contain hazardous material.

The preferred method also contemplates the possibility of pre-heating the contaminated soil in cold weather before the permanganate is introduced, particularly in clay soils with high water content. The initial thermal stripping stage does not usually require preheating, since the hot air injection produces a sufficient localized heating. The follow-up stage using permanganate, however, may be aided by pre-heating the soil, particularly when the soil is allowed to settle and cool after thermal stripping. Pre-heating thaws frozen soil, dries the soil to reduce the binding effect of moisture within the soil, and increases soil temperature to accelerate the oxidation rate. A ground heater system that uses dry, radiant hydronic heat, such as provided by Ground Heaters, Inc., may be used for pre-heating of the soil. This type of heater system includes insulation blankets and a poly vapor barrier that prevents heat loss to the atmosphere. This heater system conducts a greater percentage of the generated heat into the ground than conventional hot air heating systems, thus reducing fuel cost and time. These methods were confirmed by experimental field tests.

DETAILED DESCRIPTION OF FIELD TESTING OF THE INVENTION

Field Test 1

This method of in-situ treatment was tested in a field study using permanganate as the oxidizing agent to remove residual PCE contaminant from a wet clay site following thermal stripping of bulk hydrocarbons. The treatment grid was initially treated by hot air injection for thermal stripping, using a chain trenching tool and injection nozzles as described in U.S. Pat. No. 5,631,160, entitled "Method for In-Situ Soil Remediation". The PCE contaminant level at the site before thermal stripping was in excess of 25,000 p.p.m. The thermal stripping reached an effectiveness plateau when PCE concentration was reduced to about 120 p.p.m. Although this plateau represents removal of the bulk of PCE, the residual PCE concentration was still above the protocol for acceptable remediation. This first stage contaminant level was reached in winter conditions where the average temperature was around or below freezing in wet clay soil.

A study was designed to determine whether the residual PCE could be reduced to acceptable level by permanganate in these soil conditions. A ground heater system provided by Ground Heaters, Inc. was used to apply continuous heat to raise the soil temperature to 89 degrees to a depth of 4 feet. The insulation blankets were then removed and a sodium permanganate liquid solution was spread over a test grid area.

A solution of three lbs. of sodium permanganate per cubic yard was used to cover a 100 cubic yard test grid. The permanganate solution was applied evenly to the surface area of the test grid by a gravity-fed wand applicator placed within eighteen inches of the ground surface to maintain an even, satisfactory application rate and reduce fugitive mist or potential errant spills. The soil in the test grid was treated with a fixed amount of solution in layers exposed by a hoe.

A mobile in-situ treatment unit (MITU) from CBA Environmental Inc., essentially as described in U.S. Pat. No. 5,631,160, was used to comminute and aerate the soil while further mixing the permanganate into the soil. Forced hot air was injected into the soil as it was being churned by the trencher tool. Vapors were collected by the vacuum recovery hood. When soil mixing was completed, the area was recovered with the insulation blankets and the ground heater was used to maintain the soil temperature for residual oxidation underground.

Soil samples were taken at various time point intervals and tested for PCE content. Following the initial thermal stripping, PCE concentration had been reduced to 120 p.p.m. After the ground pre-heating, introduction of sodium permanganate, resumed trencher churning with hot air injection and covering with insulation blankets as described above, soil samples evidenced PCE level reduction to 68 p.p.m. at the 24 hours time interval and to 38 p.p.m. after 48 hours. Final results demonstrated attainment of the target level of PCE.

Field Test 2

A second test site confirmed a similar reduction in PCE contamination, and additionally demonstrated that the permanganate treatment did not effect a prior treatment for chromium stabilization. This site consisted of a 20 by 20 foot grid at a site that had previously undergone chromium stabilization with ferrous sulfate. The initial trencher churning accompanied by hot air injection netted a thermal stripping reduction of PCE from 21,000 p.p.m. to 4,900 p.p.m. The site was then treated with potassium permanganate.

The permanganate application involved removing a two-foot layer of soil from half of the grid area, mixing it with the potassium permanganate, and transferring the soil to the untreated half of the grid. This was followed by a removal of another two feet of soil from the same half of the grid and mixing it with the potassium permanganate. The soil was then returned to that half of the grid and thoroughly churned while hot air was injected hot air using the MITU device. The same procedure was repeated for the other half of the grid. With this treatment protocol, PCE concentration was reduced from 4,900 p.p.m. to 1480 p.p.m. in 24 hours and <1,000 p.p.m. in 48 hours. There was no noticeable increase in the chromium TCLP, indicating that the thermal and permanganate treatment would not destabilize the treated chromium.

Visual examination of the soil after MITU mixing demonstrated excellent distribution of the liquid permanganate. Potassium permanganate imparts a purple tint to soil. This purple color was visible throughout the soil churned by the trenching tool, including the inside of baseball-sized clay balls that were broken open to inspect for the characteristic purple tint. It appeared that there was no problem of manganese dioxide precipitate blocking the even distribution of the permanganate, and thus indicated that the permanganate applied in this manner is able to be diffused throughout the soil without the addition of other chemical agents.

The results are expected to be the same or similar using other permanganate salts (i.e., calcium permanganate) as the oxidizing agent. A permanganate or other oxidizing agent can be introduced to the soil following thermal stripping by being spread and mixed on the surface as in the field tests described above, or else sprayed directly into the soil during the mixing process by injection nozzles, as in the injection method described in U.S. Pat. No. 5,988,947. Potassium permanganate can be applied as crystalline powder or dissolved in warm water to form a permanganate solution. Sodium permanganate may be preferred when soil permeability is low because its solubility is greater than that of potassium permanganate.

This method for removal of organic contaminants in soil may be varied depending upon the particular geology and hydrology of a given site and nature of the contamination. In cold conditions it may be useful to use pre-heating of the soil prior to introducing the oxidizing agent, and to cover the soil with insulation blankets after the oxidizing agent is applied, as described in Field Test 1. In other conditions, the sequential use of thermal stripping and chemical oxidation should be sufficient. Organic contaminants may also be found in saturated soils, sediment, and sludge. In such semi-liquid contaminated strata, a solidification agent may be added before treatment. Sensors may be employed in conjunction with the trenching device to monitor temperature, pH, or other variables.

Although the methods described above were to used to treat PCE contaminated soil, similar steps can be used for any contaminant organic compound that is susceptible to thermal stripping with hot air. Moreover, while permanganate was the chemical oxidizing agent used in the examples, other chemical oxidizing agents may be used instead. The full scope of the methods of the invention should be determined from the claims which follow.

I claim:

1. A method of in-situ soil remediation to reduce the concentration level of a contaminant organic compound in soil to a target concentration level, comprising, in sequence, the steps of:
   a) comminuting the soil in situ with a trenching tool;
   b) during comminution, injecting hot air into the soil to thermally strip off organic compounds, including natural and benign organic compounds, the step of injecting hot air being continued until the concentration of the contaminant compound is reduced by more than fifty percent of its original level; and
   c) introducing a chemical oxidizing agent into the soil in an amount that is effective over reasonable time to reduce the contaminant concentration level to or below the target level.

2. A method as in claim 1, comprising the additional step of preheating the soil with a ground heater system prior to introducing the chemical oxidizing agent.

3. A method as in claim 1, comprising the additional step of covering the soil with thermal insulation after introducing the chemical oxidizing agent.

4. A method of in-situ soil remediation with a chemical oxidizing agent to reduce the concentration level of a volatile organic contaminant to a target concentration level, comprising the sequential steps of:
   a) treating the contaminated soil in-situ by a thermal-stripping process in which the soil is churned by a soil mixing device and hot air is injected into the soil as it is being churned to thermally strip off organic compounds, including the volatile organic contaminant, the thermal-stripping process being continued until such thermal stripping is no longer practically effective in further reducing the contaminant level of the volatile organic contaminant;
   b) determining the concentration level of the volatile organic contaminant remaining after the thermal stripping process; and
   c) further reducing the concentration of the volatile organic contaminant by introducing a chemical oxidizing agent into the soil in an amount that is effective over reasonable time to reduce the concentration level to or below the target level.

5. A method as in claim 4, wherein the volatile organic contaminant is from the group of:
   benzene, ethyl benzene, toluene, xylene, methylene chloride, 1,2-dichloroethane, 1,1,1-trichloroethane (TCA), carbon tetrachloride, chloroform, chlorobenzenes, ethylene dibromide, tertiary butyl ether, tetrachloroethylene (PCE), trichloroethene (TCE), dichloroethene (DCE) and vinyl chloride.

6. A method as in claim 5, wherein the chemical oxidizing agent is permanganate.

7. A method of soil remediation to reduce the concentration level of a contaminant organic compound in soil to a target concentration level, comprising, in sequence, the steps of:
   a) churning the soil with a soil mixing device;
   b) during churning, injecting hot air into the soil to thermally strip off organic compounds, including natural and benign organic compounds, to reduce the contaminant concentration level to a decreased level that is still above the target level, the step of injecting hot air into the soil being continued until such thermal stripping is no longer practically effective in further reducing the contaminant concentration level; and
   c) introducing a chemical oxidizing agent into the soil in an amount that is effective over reasonable time to further reduce the concentration level of the thermally stripped contaminant to or below the target level.

8. A method as in claim 7 wherein the contaminant is tetrachloroethylene.

9. A method as in claim 7 wherein the contaminant is selected from the group consisting of benzene, ethyl benzene, toluene, xylene, methylene chloride, 1,2-dichloroethane, 1,1,1-trichloroethane (TCA), carbon tetrachioride, chloroform, chlorobenzenes, ethylene dibromide, tertiary butyl ether, trichloroethene (TCE), dichloroethene (DCE) and vinyl chloride.

10. A method as in claim 7, wherein the chemical oxidizing agent is a permanganate.

11. A method as in claim 7, further comprising the step of preheating the soil with a ground heater system prior to introducing the chemical oxidizing agent.

12. A method as in claim 7, comprising the additional step of covering the soil with thermal insulation after introducing the chemical oxidizing agent.

13. A method in-situ soil remediation to reduce the concentration level of a contaminant organic compound in soil to a target concentration level, comprising, in sequence, the steps of:
   a) comminuting the soil in situ with a trenching tool;
   b) during comminution, injecting hot air into the soil to thermally strip off organic compounds, including natural and benign organic compounds, the step of injecting hot air being continued until thermal stripping is no longer practically effective in further reducing the contaminant concentration level; and
   c) introducing a chemical oxidizing agent into the soil in an amount that is effective over reasonable time to reduce the contaminant concentration level to or below the target level.

* * * * *